US009070002B2

(12) United States Patent
Al-Zahrani et al.

(10) Patent No.: US 9,070,002 B2
(45) Date of Patent: Jun. 30, 2015

(54) METHOD OF PERFORMING FINGERPRINT MATCHING (75) Inventors: Waleed Mohammad Al-Zahrani, Dammam (SA); Lahouari Ghouti, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 925 days.

(21) Appl. No.: 13/276,159

(22) Filed: Oct. 18, 2011

(65) Prior Publication Data

US 2013/0094724 A1    Apr. 18, 2013

(51) Int. Cl.
  G06K 9/00     (2006.01)
  G06K 9/46     (2006.01)
  G06K 9/52     (2006.01)

(52) U.S. Cl.
  CPC .......... G06K 9/0008 (2013.01); G06K 9/00067 (2013.01); G06K 9/001 (2013.01); G06K 9/4642 (2013.01); G06K 9/525 (2013.01)

(58) Field of Classification Search
  CPC .... G06T 7/0012; G06K 9/4671; G06K 9/525; G06K 9/00046; G06K 9/00711; G06K 9/00006; G06K 9/00067
  USPC ....................................................... 382/100
  See application file for complete search history.

(56) References Cited

U.S. PATENT DOCUMENTS

2003/0169910 A1    9/2003    Reisman et al.

FOREIGN PATENT DOCUMENTS

WO    WO 2004063974 A1    7/2004

OTHER PUBLICATIONS

Muralidharan et al., Scale Invariant Feature Extraction for Identifying an Object in the Image using Moment Invariants [on-line], Dec. 27-29, 2010 [retrieved Nov. 12, 2014], 2010 International Conference on Communication and Computational Intelligence, pp. 452-456. Retrieved Internet: http://ieeexplore.ieee.org/xpls/abs_all.jsp?arnumber=5738772&tag=1.*
Liu et al., Recognition of the blurred image by complex moment invariants [on-line], Jun. 2005 [retrieved Nov. 12, 2014], Pattern Recognition Letters, vol. 26, Issue 8, pp. 1128-1138. Retrieved from Internet: http://www.sciencedirect.com/science/article/pii/S0167865504003149.*

(Continued)

*Primary Examiner* — Matthew Bella
*Assistant Examiner* — Dennis Rosario
(74) *Attorney, Agent, or Firm* — Richard C Litman (57) ABSTRACT The method of performing fingerprint matching includes a matching algorithm that combines affine moment invariants (AMIs) and translation, rotation and scaling invariants (TRS) based on moments analysis without requiring minutiae detection. Preprocessing normalizes the fingerprint image using the Federal Bureau of Investigation's wavelet scalar quantification (WSQ) compression standard definition. Analysis of the orientation field reliably and accurately determines the reference point. The area within a predetermined range around the detected reference point is used as a region of interest (ROI) for feature extraction. A directional filter bank transform (DFB) obtains directional components of the image. An invariant moment analysis on sub-bands of the filtered images extracts features while limiting the effects of noise and non-linear distortions. Absolute distance is used to match the fingerprints.

7 Claims, 5 Drawing Sheets

(56) References Cited

OTHER PUBLICATIONS

Jin et al., An efficient fingerprint verification system using integrated wavelet and Fourier-Mellin invariant transform [on-line], Jun. 1, 2004 [retrieved Nov. 12, 2014], Image and Vision Computing, vol. 22, Issue 6, pp. 503-513. Retrieved from the Internet: http://www.sciencedirect.com/science/article/pii/S0262885603002452.*

Teague, Image analysis via the general theory of moments [on-line], Aug. 1, 1980 [retrieved Nov. 12, 2014], Journal of the Optical Society of America, vol. 70, Iss. 8, pp. 920-930. Retrieved from the Internet: http://www.opticsinfobase.org/josa/abstract.cfm?uri=josa-70-8-920.*

Yang et al., Applying Learning Vector Quantization Neural Network for Fingerprint Matching [on-line], 2006 [retrieved Mar. 25, 2015], Lecture Notes in Computer Science, vol. 4304, pp. 500-509. Retrieved from: http://link.springer.com/chapter/10.1007/11941439_54.*

Al-Turaihi, Hand Palmprint Authentication System [on-line], Dec. 2004 [retrieved Mar. 25, 2015], Dissertation, University of Baghdad, 2004. Retrieved from http://www.scbaghdad.edu.iq/library/Computer%20Science/MS.C/2004/Hand%20Palmprint%20Authentication%20System.pdf.*

Jain, A.K., Prabhakar, S., Hong, L., and Pankanti, S., Filterbank-based fingerprint matching, *Image Processing, IEEE Transactions on*, vol. 9, Issue 5, pp. 846-859, May 2000.

Danielsson, P.E. and Ye Qun-Zhong, Rotation-invariant operators applied to enhancement of fingerprints, *Pattern Recognition, 1988, 9th International Conference on*, Nov. 14-17, 1988, pp. 329-333, vol. 1.

* cited by examiner

METHOD OF PERFORMING FINGERPRINT MATCHING

BACKGROUND OF THE INVENTION

1. Field of the Invention

The present invention relates generally to computerized methods for processing images, and particularly to a method of performing fingerprint matching having an algorithm based on matching that combines directional features with moment invariants.

2. Description of the Related Art

Fingerprint matching techniques can be cast into four broad classes, namely, minutiae, correlation, Ridge features (texture), and Transform-based techniques. However, considering the types of information used, a method can be broadly categorized as minutiae-based or texture-based. While minutiae-based fingerprint verification systems have shown high accuracy, they ignore the rich information in ridge patterns, which can be useful to improve matching accuracy.

Texture-based fingerprint matching techniques include those that use fingerprint ridge features. Methods exist that estimate the nonlinear distortion in fingerprint pairs based upon ridge curve correspondences.

Exemplary prior art filter banks and directional filter banks employ a filter-based algorithm using a bank of Gabor filters. Gabor filters are used to capture local and global details of a fingerprint into a fixed finger code. Fingerprint matching is then performed using the Euclidean distance between two corresponding finger codes.

Another approach, which is based on DFB filtering, decomposes the fingerprint image into eight directional sub-band outputs. This creates a frequency decomposition of the input and output that can be used to create a filtered image output. Directional energy distributions for each block are then extracted from the decomposed sub-bands. To reduce noise effect and improve efficiency, only dominant directional energy components are kept as elements of the input feature vector. Additional input feature vectors in which various rotations are considered are extracted, and these input feature vectors are compared with an enrolled template feature vector.

The aforementioned texture and transform-based matching methods have advantages dealing with such images, as they utilize features that are not based solely on minutiae templates. However, it should be noted that one main advantage of minutiae-based approaches is that they are faster. There remains a need for a fast texture and transform-based matching model.

Thus, a method of performing fingerprint matching solving the aforementioned problems is desired.

SUMMARY OF THE INVENTION

The method of performing fingerprint matching includes a matching algorithm that combines affine moment invariants (AMIs) with translation, rotation and scaling invariants (TRS), and is based on moments analysis without requiring minutiae detection. Preprocessing normalizes the fingerprint image using the Federal Bureau of Investigation's wavelet scalar quantification (WSQ) compression standard definition. Analysis of the orientation field reliably and accurately determines the reference point. The area within a predetermined range around the detected reference point is used as a region of interest (ROI) for feature extraction. A directional filter bank transform (DFB) obtains directional components of the image. An invariant moment analysis on sub-bands of the filtered images extracts features, while limiting the effects of noise and non-linear distortions. Absolute distance is used to match the fingerprints.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
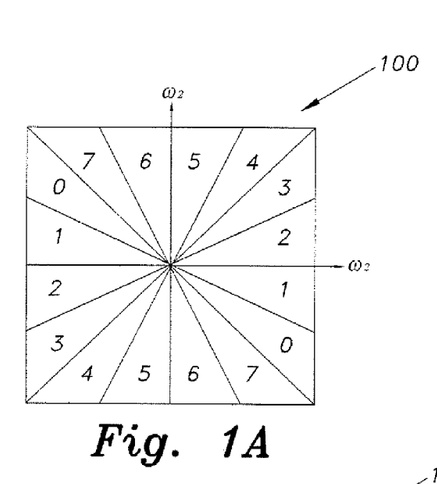
FIG. 1A is an input frequency partition map used in a method of performing fingerprint matching according to the present invention.
Figure 1B:
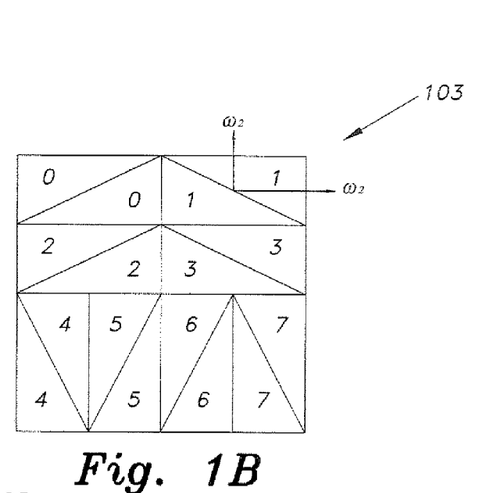
FIG. 1B is a sub-band output used in a method of performing fingerprint matching according to the present invention.
Figure 1C:
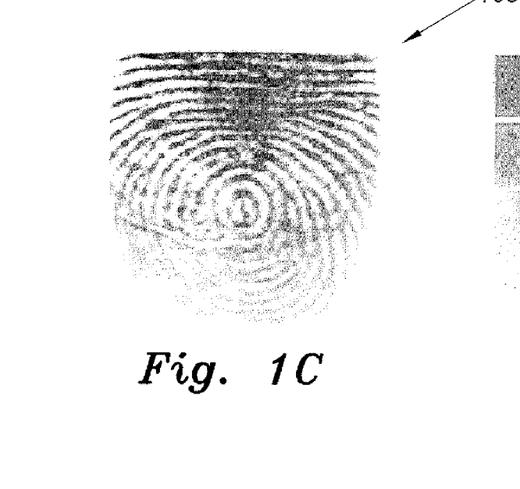
FIG. 1C is an exemplary fingerprint image.
Figure 1D:
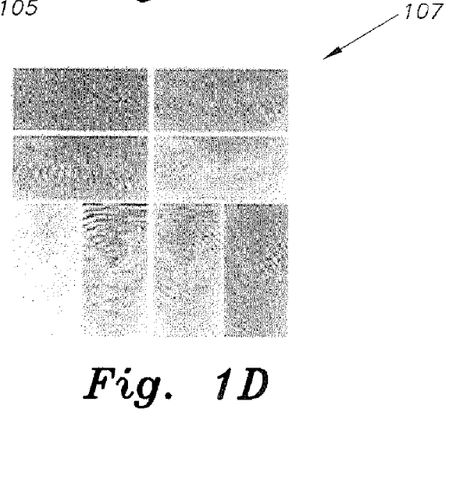
FIG. 1D is a sub-band outputs decomposition using 8-band DFB in a method of performing fingerprint matching according to the present invention.
Figure 2:
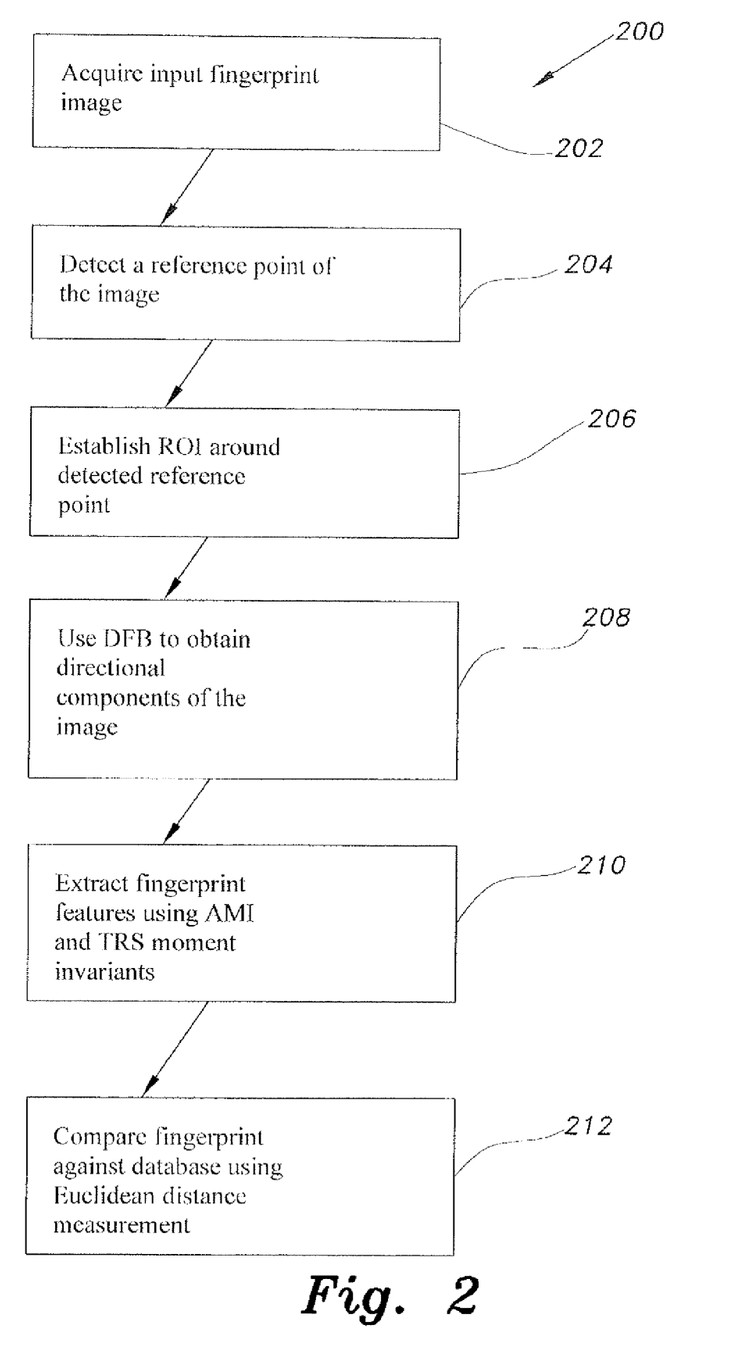
FIG. 2 is a flowchart of a method of performing fingerprint matching according to the present invention.

The method of performing fingerprint matching includes a matching algorithm summarized in the flowchart 200 shown in FIG. 2 that combines affine moment invariants (AMIs) with translation, rotation and scaling invariants (TRS), and is based on moments analysis without requiring minutiae detection. Preprocessing normalizes the fingerprint image using the Federal Bureau of Investigation's wavelet scalar quantification (WSQ) compression standard definition. This matching algorithm includes steps 202 through 212, comprising acquiring an input fingerprint image 202, detecting a reference point of the image 204, establishing a region of interest around the detected reference point 206, using a filter bank to obtain directional components of the image 208, extracting fingerprint features using moment invariants 210, and comparing the fingerprint using a Euclidean distance measurement against a reference fingerprint 212.

Analysis of the orientation field reliably and accurately determines the reference point. The area within a predetermined range around the detected reference point is used as a region of interest (ROI) for feature extraction. A directional filter bank transform (DFB) obtains directional components of the image.

An invariant moment analysis on sub-bands of the filtered images extracts features, while limiting the effects of noise and non-linear distortions. Absolute distance is used to match the fingerprints.

A fingerprint consists of a series of ridges that mainly flow parallel to the locally dominant direction and occasionally make local singularities, like a core or delta point. Since fingerprint patterns have strong directionality, directional information can be exploited as fingerprint features. In this sense, a DFB is suitable for extracting the features of fingerprints containing many linear and directional components because it can effectively and accurately decompose an image into several directional sub-band outputs.

The DFB basically consists of low pass filters ($H_0$), quincunx down samplers (Q) (a quincunx is five coplanar points, four of the points defining a rectangle or square, the fifth point being in the center), diamond conversion matrices (R), modulators ($e^{-j\omega 1\pi}$), and postsampling matrices (B). The modulator varies the spectrum of the image so that the modulated image can be divided into two directional sub-band images by a low pass filter with a diamond-shaped pass-band. Meanwhile, the quincunx down sampler simultaneously down samples the image and rotates it by 45°.

The input is modulated, filtered, and downsampled, resulting in two sub-band images. Then the two sub-band images are further divided into four sub-band images using a procedure similar to that used in the first step. In the final phase, diamond conversion matrices are required to transform the parallelogram-shaped pass-band into one with a diamond shape. These diamond conversion matrices enable the DFB to be implemented using only a one-dimensional (1-D) filter prototype. Postsampling matrices are then appended to the end of the filter bank to remove the phenomenon of frequency scrambling, resulting from the frequency shift due to the modulator and non-diagonality of the overall down sampling matrix. Filter bank stages can be implemented in a separable polyphase form to achieve highly efficient realizations. Then, eight directional sub-band outputs are generated.

The method of performing matching identification uses a DFB structure known by artisans of ordinary skill. However, the design of the low pass filters is achieved through a linear phase IIR (Infinite Impulse Response) filter. As a result of the downsampling, the eight-band decompositions are rectangular. The analysis stage is based on a third-order decomposition of N×N images, leading to eight sub-bands where the first half of the sub-bands has a size of N/4×N/2, while the other half has a size of N/2×N/4, respectively.

The method of performing fingerprint matching also contemplates the use of curvelet basis functions. The curvelet transform is obtained by filtering and then applying windowed ridgelet transforms on each bandpass image. This is done by sub-band decomposition of the object into sequences of sub-bands. After that, each sub-band is windowed into blocks of appropriate size, depending on its center frequency. Finally, ridgelet transforms will be applied on windowed blocks. Therefore, curvelet basis functions can be viewed as a local grouping of wavelet basis functions into linear structures so that they can capture the smooth discontinuity curve more efficiently.

Some properties of the fingerprints include directional components. Directional components may be characterized mathematically by a gradient $G_{mn}$, as defined in equation (1), and corresponding angle $\theta_{mn}$, as defined in equation (2), as follows:

$$G_{min} = M \times (|G_{mn}^x| + |G_{mn}^y|) \tag{1}$$

$$\theta_{mn} = \tan^{-1}[G_{mn}^y / G_{mn}^x] \tag{2}$$

A local dominant orientation estimate is then defined by equation (3):

$$\rho_{mn} = \frac{\sum_{(i,j) \in w} G_{ij} \cos(\theta_{mn} - \theta_{ij})}{\sum_{(i,j) \in w} G_{ij}} \tag{3}$$

Dominant local orientation $\theta$ is defined as:

$$\theta = \frac{1}{2}\tan^{-1}\left[\frac{\sum_{m=1}^{M}\sum_{n=1}^{N} \rho_{mn}^2 \sin(2\theta_{mn})}{\sum_{m=1}^{M}\sum_{n=1}^{N} \rho_{mn}^2 \cos(2\theta_{mn})}\right] + \frac{\pi}{2} \tag{4}$$

With respect to directional filter bank analysis of the fingerprint where the input image is analyzed into directional sub-band images, each directional block may have a directional energy defined as:

$$E_k(I,J) = \sum_{i=0}^{mk} \sum_{j=0}^{nk} |f_k(I,J;i,j)| \tag{5}$$

A direction based on gradient-based methods and filtered for noise is defined by equation (6):

$$d(I, J) = m, \text{ if } \underset{m}{Maximize}[E_m(I, J)] \tag{6}$$

Recognizing patterns in images has three main approaches: brute force, image normalization and invariant features. Brute force requires the use of all possible representations of images, which include their rotated, scaled, blurred and deformed versions.

This method will have a very high time complexity, which is not desirable. The image normalization approach transforms the image into a standard position, which requires the solving of difficult inverse problems that are ill-posed or ill-conditioned.

The invariants approach uses a set of measurable quantities that are insensitive to particular deformation. Those invariant features have enough discriminating power to distinguish patterns into different classes. Mathematically speaking, selected features have the property called invariance, which can be expressed as:

$$I(f) = I(D(f)) \tag{7}$$

That is, invariant I is a function that does not change its value under degradation operator D. Invariants have different categories based on different points of view, and can be categorized based on the type of invariance, namely, translation, rotation, scaling, affine, projective, and elastic geometric invariants. They may also be categorized based on radiometric invariants, which exist with respect to linear contrast stretching, nonlinear intensity transformers, and convolution. Moreover, the linear invariants may be categorized based on mathematical tools, such as a simple shape descriptor, like compactness, convexity, elongation, etc. Transform coefficient features, such as Fourier, wavelet, and Hadamard descriptors, such as Point set invariants, which use positions of dominant points, or differential invariants, which use derivatives of the object boundary, are also linear invariant categories. Moment invariants use special functions of image moments.

Categories may also be based on the part of the object needed to calculate the invariant, such as global invariants, which are calculated from the whole image, or local invariants, which are calculated from dominant points. Semi-local invariants use properties from both global and local invariants.

Moments are scalar quantities used to characterize a function and to capture its significant features, and used in statistics for describing the shape of a probability density function. Mathematically speaking, moments are "projections" of a function onto a polynomial basis.

Broadly speaking, moments are categorized, according to the polynomial basis used, into geometric and complex moments, and orthogonal moments. In the image processing field, a moment is a certain particular weighted average of the image pixel intensities, or a function of such moments, usually chosen to have some attractive property or interpretation. Image moments are useful to describe objects after segmentation. Simple properties of the image that are found via image moments include area, intensity, centroid, and information about its orientation.

The geometric moments of the 2-D continuous function $f(x,y)$, with a standard power basis $k_{pq}(x,y)=x^p y^q$ is defined by:

$$M_{pq}=\int_{-\infty}^{\infty}\int_{-\infty}^{\infty} x^p y^q f(x,y) dx dy \text{ for } p, q=0,1,2,\ldots,n \quad (8)$$

Adapting the above equation to scalar (grayscale) image with pixel intensities $I(x,y)$, raw image moments are calculated by:

$$M_{ij}=\Sigma_x \Sigma_y x^i y^j I(x,y) \quad (9)$$

Complex moments are based on the polynomial basis $k_{pq}(x,y)=(x+iy)^p=(x-iy)^q$ and are defined by:

$$c_{pq}=\int_{-\infty}^{\infty}\int_{-\infty}^{\infty}(x+iy)^p(x-iy)^q f(x,y) dx dy \quad (10)$$

Orthogonal (OG) moments are preferred in the literature because they are a fast and stable numerical implementation. Another reason why OG moments are used is due to better image construction. A 2D polynomial orthogonal on a rectangle is constructed as products of 1D OG polynomials $p_k(x)$. The OG moments will have the form:

$$v_{pq}=n_p n_q \int_\Omega p_p(x) p_q(y) f(x,y) dx dy \quad (11)$$

where $n_p$, $n_q$ are some normalized factors and $\Omega$ is the area of orthogonality. The image $f(x,y)$ should be scaled such that its support is contained in $\Omega$.

The method of performing fingerprint matching preferably uses translation, rotation and scaling invariants (TRS). Thus, moment features are favored because their features can provide the properties of invariance to scale, position, and rotation. For a 2-D continuous function $f(x,y)$, the moment of order $(p+q)$ is defined as:

$$m_{pq}=\int_{-\infty}^{\infty}\int_{-\infty}^{\infty} x^p y^q f(x,y) dx dy \text{ for } p, q=0,1,2,\ldots,n \quad (12)$$

The central moments are defined as:

$$\mu_{pq} = \int_{-\infty}^{\infty}\int_{-\infty}^{\infty}(x-x_c)^p(y-y_c)^q f(x,y) dx dy \quad (13)$$

where, $$x_c = \frac{m_{10}}{m_{00}} \text{ and } y_c = \frac{m_{01}}{m_{00}} \quad (14)$$

If $f(x,y)$ is a digital image, then equation (13) becomes:

$$\mu_{pq}=\Sigma_x \Sigma_y (x-x_c)^p (y-y_c)^q f(x,y) \quad (15)$$

Invariance is obtained by proper normalization of each moment. In principle, any moment can be used as a normalizing factor, provided that it is nonzero for all images in the experiment. Since low-order moments are more stable to noise and easier to calculate, we normalize most often by a proper power of $\mu_{00}$ as follows:

$$v_{pq} = \frac{\mu_{pq}}{\mu_{00}^w} \quad (16)$$

where, $$w = \frac{p+q}{2} + 1 \quad (17)$$

The moment $v_{pq}$ is called normalized central geometric moment. Note that the moment that was used for scaling normalization can no longer be used for recognition because the value of the corresponding normalized moment is always one.

Affine moment invariants (AMIs) play a very important role in moment-based pattern recognition applications. They are invariant with respect to affine transform of the spatial coordinates. Affine transformation is a general linear transform of spatial coordinates of the image, which can approximate the projective transform.

The theory of AMIs is closely connected to the theory of algebraic invariants, and the Fundamental theorem describes this connection. The algebraic invariant is a polynomial of coefficients of a binary form, whose value remains the same after an affine transform of the coordinates. In the theory of algebraic invariants, only the transforms without translation are considered. Let us consider an image f and two arbitrary points $(x_i,y_j)$, $(x_2,y_2)$ from its support. Let us denote the "cross-product" of these points as $C_{12}$:

$$C_{12}=x_1 y_2 - x_2 y_1 \quad (18)$$

After an affine transform, it holds that:

$$C_{12}'=J \cdot C_{12}, \quad (19)$$

which means that $C_{12}$ is a relative affine invariant. Various numbers of points are considered and their cross products integrated on the support of f. These integrals can be expressed in terms of moments and, after proper normalization, they yield affine invariants.

Mathematically, having r points (r≥2) A functional I is defined depending on r and on non-negative integers $n_{kj}$, as:

$$I(f)=\int_{-\infty}^{\infty}\int_{-\infty}^{\infty} \prod_{k,j=1}^{r} C_{kj}^{n_{kj}} \cdot \prod_{i=1}^{r} f(x_i,y_i) dx_i dy_i \quad (20)$$

Note that it is meaningful to consider only j>k because $C_{kj}=-C_{jk}$ and $C_{kk}=0$. After an affine transform, I(f) becomes:

$$I(f)'=j^W |J|^r \cdot I(f) \quad (21)$$

where $w=\Sigma_{k,j} n_{kj}$ is called the weight of the invariant and r is called the degree of the invariant. If I(f) is normalized by $\mu_{00}^{w+r}$, a desirable absolute affine invariant is obtained:

$$\left(\frac{I(f)'}{\mu_{00}^{w+r}}\right) = \left(\frac{I(f)}{\mu_{00}^{w+r}}\right) \quad (22)$$

The maximum order of moments of which the invariant is composed is called the order of the invariant. The order is always less than or equal to the weight.

An important note here is that we can generate as many invariants as we wish but only a few of them are independent since dependent invariants are useless in practice, in the sense that they do not increase the discrimination power of the recognition system at all while increasing the dimensionality of the problem. This leads to growth of the complexity and even to misclassifications.

There might be various kinds of dependency in the set of all AMIs. They can be categorized into five groups: (1) Zero invariants: Some AMIs may be identically zero regardless of the image from which they are calculated. (2) Products: Some invariants may be products of other invariants. (3) Linear combinations: Some invariants may be linear combinations of other invariants. (4) Identical invariants. (5) Polynomial dependencies: if there exists a finite sum of products of invariants (including their integer powers) that equals zero, the invariants involved are polynomially dependent.

The invariants having the dependencies (1) to (4) are called reducible invariants. After eliminating all of them, a set of so-called irreducible invariants is obtained. However, irreducibility does not mean independence. Eighty independent invariants (AMIs up to the weight 12) out of 1589 irreducible invariants are used by the method of performing fingerprint matching.

For feature extraction, the original fingerprint image is decomposed into eight directional sub-band outputs using the DFB. The moment invariants to translation, rotation, and scaling and affine moment invariants (independent and irreducible) of each block can be obtained from the decomposed sub-band outputs. Let $f_\theta(x, y)$ denote the coefficient at position (x, y) of sub-band B corresponding to a region of interest (ROI) of image block B, where $\theta \in \{, 1, 2, \ldots, 7\}$ for the sub-bands.

Figure 3A:
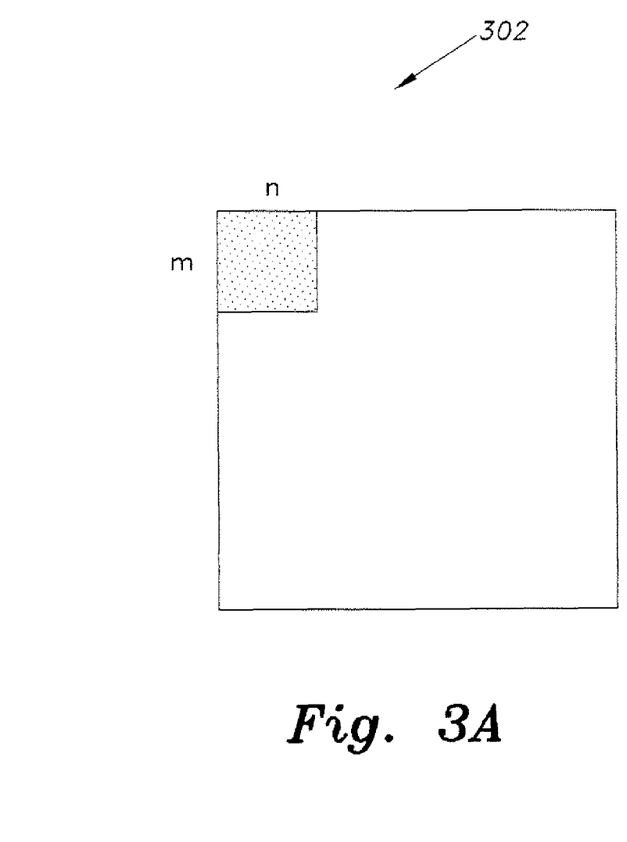
FIG. 3A is an original image block used in a method of performing fingerprint matching according to the present invention.
Figure 3B:
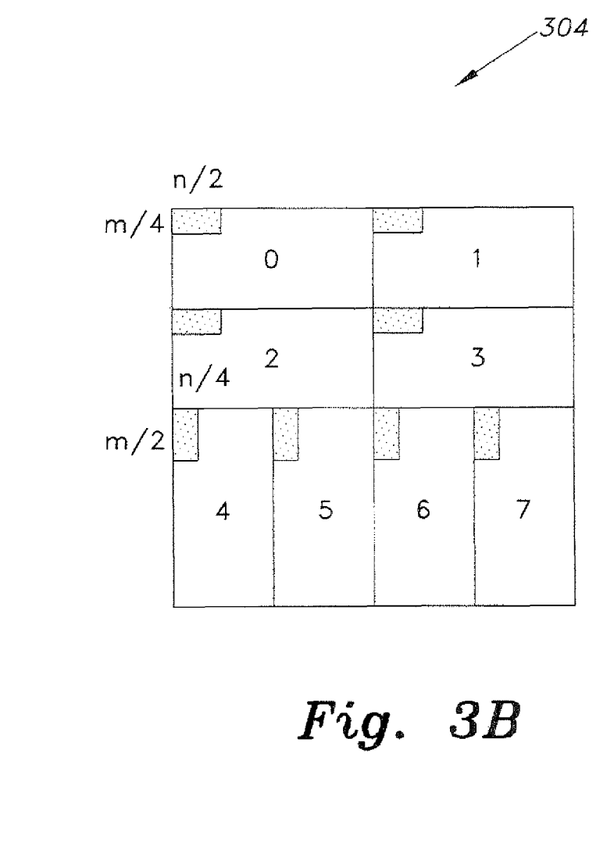
FIG. 3B are sub-band output blocks used in a method of performing fingerprint matching according to the present invention.

For an N×N image, the first half of the eight sub-band outputs is N/4×N/2 in size, while the other half is N/2×N/4. Therefore, the sub-bands corresponding to an m×n block have size m/4×n/2 for directions 0 to 3, and size m/2×n/4 for directions 4 to 7, as illustrated in the original image block diagram 302 of FIG. 3A and the sub-band output block diagram 304 of FIG. 3B.

The proposed scheme of feature extraction first locates a reference point and establishes an ROI around the detected reference point. The established ROI is then decomposed into eight directional sub-band outputs using a DFB.

Finally, the fingerprint feature values based on moment invariants (TRS & AMIs) are calculated from each sub-block of the decomposed sub-band outputs.

Figure 4:
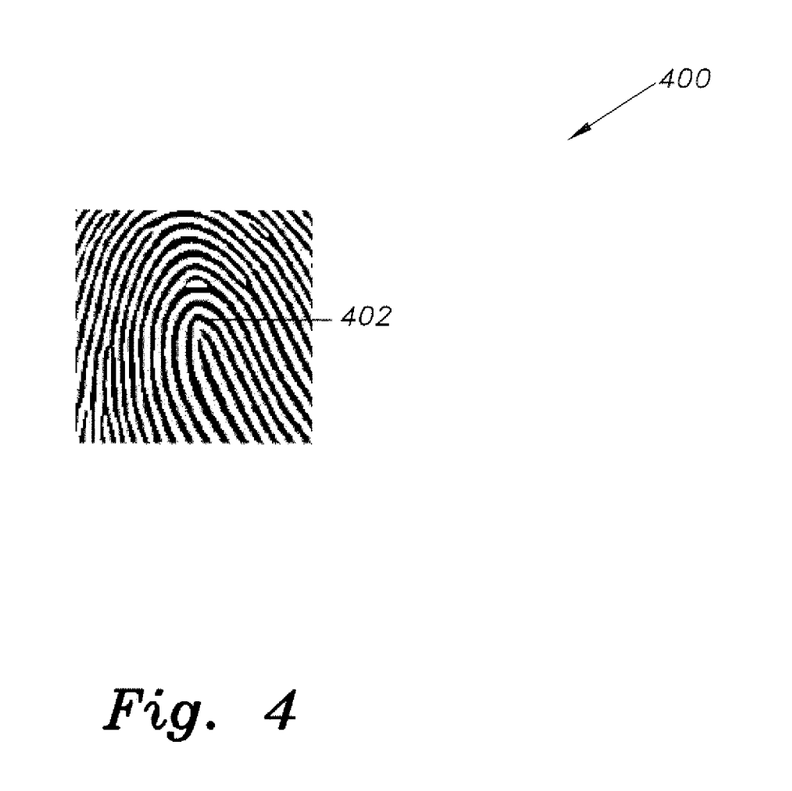
FIG. 4 shows a reference point on the convex ridge used in a method of performing fingerprint matching according to the present invention.

With respect to image normalization, the objective is to decrease the dynamic range of the gray between ridges and valleys of the image. We normalize the image to constant mean and variance. Normalization is done to remove the effects of sensor noise and finger pressure difference. Let I(I,j) denote the gray value at pixels (i,j). M and VAR are the estimated mean and variance of the input fingerprint image. We use the FBI WSQ standard for gray scale images:

$$I'(i, j) = \frac{I(i, j) - M}{VAR'}, \quad (23)$$

where VAR'=VAR/128 for 8 bits of precision per pixel. As shown in FIG. 4, the fingerprint 400 has a reference core point 402, which is defined as the point of the maximum curvature on the convex ridge and is usually located in the central area of a fingerprint, such as fingerprint 400. A summary of reference point location algorithm is presented below. (1) Estimate the orientation field O using a window size of w×w. (2) Smooth the orientation field in a local neighborhood. Let the smoothed orientation field be represented as O'. In order to perform smoothing (low-pass) filtering, the orientation image needs to be converted into a continuous vector field, which is defined as:

$$\phi_x(i,j) = \sum_{u=-w_\phi/2}^{w_\phi/2} \sum_{v=-w_\phi/2}^{w_\phi/2} W(u,v) \cdot \phi_x(i-uw, j-vw) \quad (24)$$

$$\phi_y(i,j) = \sum_{u=-w_\phi/2}^{w_\phi/2} \sum_{v=-w_\phi/2}^{w_\phi/2} W(u,v) \cdot \phi_y(i-uw, j-vw) \quad (25)$$

where W is a two-dimensional low-pass filter with unit integral and $w_\phi \times w_\phi$ specifies the size of the filter. (3) Compute $\epsilon$, an image containing only the sine component of O'. (4) Initialize A, a label image used to indicate the reference point. (5) For each pixel (i j), integrate pixel intensities (sine component of the orientation field). (6) Find the maximum value and assign its coordinate as the reference point.

Figures 5, 7:
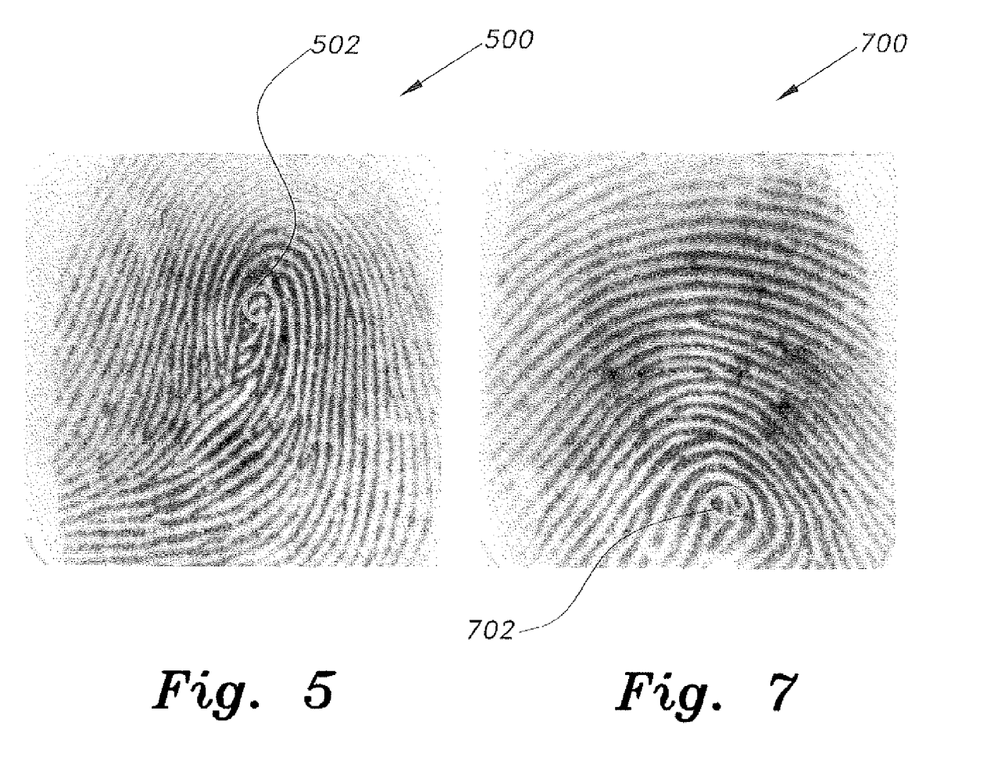
FIG. 5 is a sample fingerprint used to explain features of a method of performing fingerprint matching according to the present invention.
FIG. 7 is a sample fingerprint used to explain features of a method of performing fingerprint matching according to the present invention.
Figure 6:
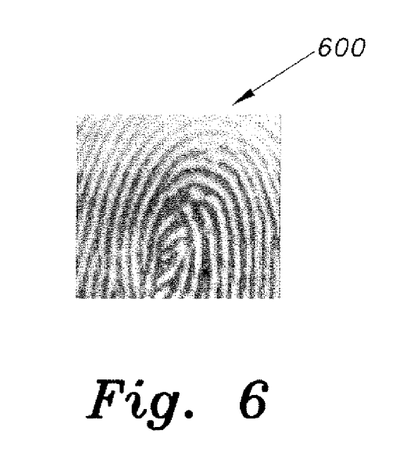
FIG. 6 is an ROI (region of interest) of the sample fingerprint of FIG. 5.
Figure 8:
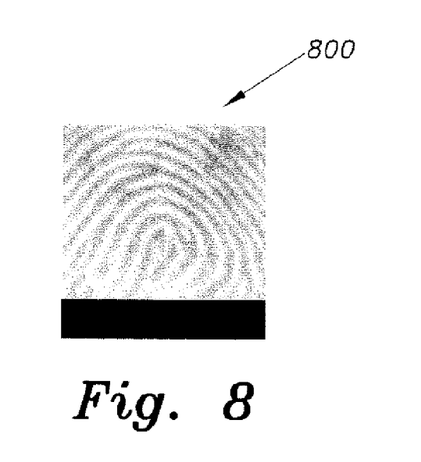
FIG. 8 is an ROI of the sample fingerprint of FIG. 7.

After determining the coordinates of the reference point, we crop the fingerprint image into an ROI. In order to speed up the overall process, we use only a predefined square area (ROI) with size N×N around the reference point at the center for feature extraction, instead of using the entire fingerprint. In our experiment, we set N to 192. FIGS. 5 and 6, and FIGS. 7 and 8 demonstrate the ROI centered on the determined reference point of two input fingerprints, respectively. As shown in FIGS. 5 and 6, the center of the cropped image 600 (FIG. 6) centers the position of the reference point 502 of fingerprint 500 (FIG. 5), whose ROI is established within the image. As shown in FIGS. 7 and 8, the center of the cropped image 800 (FIG. 8) centers the position of the reference point 702 of fingerprint 700 (FIG. 7), whose ROI exceeds the image bound.

In case the detected reference point is located at the corner of the image, as shown in FIG. 8, establishing the ROI of a fingerprint exceeds the bound of an image. In such a case, the method of performing fingerprint matching sets up the ROI by inserting zeros in the outside area of the image. The ROI area with zero value is excluded when fingerprint features are calculated and matching is performed. At this stage, invariant moment analysis is applied on each one of the eight sub-bands, respectively.

As shown in FIGS. 1A, 1B, 1C, and 1D, the extracted ROI is decomposed into eight directional sub-band outputs. This procedure is accomplished by the use of an eight-band DFB. As most clearly shown in frequency partition map 100 and sub-band output diagram 103, it should be noted that each sub-band is divided into sub-blocks, and a set of 35 independent AMIs and 21 TRS moment invariants of the 5th order are computed for each sub-block. As a result 56 sets of invariant moments for each of the 8 sub-blocks are extracted as features to represent a fingerprint (see the decomposed sub-band outputs 107 of FIG. 1D, which have been decomposed from print image 105, shown in FIG. 1C.

The procedure for feature extraction can be summarized as follows. (1) Normalize the image. (2) identify the core point and extract the ROI. (3) Apply the eight-band DFB to the ROI with dimension N×N. The output is a set of eight sub-bands. (4) Further divide each sub-hand output into sub-blocks that will serve as the region of support for the feature vector calculations. If we envision a sub-block of size n×n (where N is a multiple of n) then the sizes of the corresponding sub-blocks with the sub-bands are n/4×n/2 for sub-bands 0 to 3 and n/2×n/4 for sub-bands 4 to 7. (5) Calculate the 56 set of invariant moments from each "smaller block" to form a feature vector, as discussed above. (6) Finally, combine the features calculated from each sub-block $i_{\theta k}$ into one vector, $V_f = \{I_{\theta 1}, I_{\theta 2}, \ldots, I_{\theta k}\}$, where $\theta \in \{0, 1, 2, 3, 4, 5, 6, 7\}$ and $k \in \{0, 1, 2, \ldots, 56\}$.

With respect to fingerprint matching, generally speaking, other methods require that before the input print and template print are compared with each other, they should be translationally and rotationally aligned with each other. Rotational alignment is achieved by generating cyclical input feature vectors and matching input feature vectors with template feature vectors. In the method of performing fingerprint matching, the translational alignment is not of concern because invariant analysis is applied to the extracted ROI by the reference point detection process. Since the feature extraction process is based on moments that are invariant to translation, rotation and scaling, the proposed method is robust to angular deviations without rotation and translation compensation.

Fingerprint matching is performed based on finding the absolute distance between the input feature vectors and the template feature vector enrolled in the database. Let:

$$V_{f1}=\{a_1, a_2, \ldots, a_n\} \text{ and } V_{f2}\{b_1, b_2, \ldots, b_n\} \quad (26)$$

Denoting the feature vectors of the two fingerprints to be matched, the difference vector $V_d$ of the two fingerprint feature vectors is calculated as in (27).

$$V_d = \left( \frac{|a_1 - b_1|}{\max(a_1, b_1)}, \frac{|a_2 - b_2|}{\max(a_2, b_2)}, \cdots \frac{|a_n - b_n|}{\max(a_n, b_n)} \right) \quad (27)$$

The absolute distance of the two matching vectors is defined as in (28).

$$R_m = \sum_{i=1}^{n} \frac{|a_i - b_i|}{\max(a_i, b_i)} \quad (28)$$

It will be understood that the diagrams in the Figures depicting the method of performing fingerprint matching are exemplary only, and may be embodied in a dedicated electronic device having a microprocessor, microcontroller, digital signal processor, application specific integrated circuit, field programmable gate array, any combination of the aforementioned devices, or other device that combines the functionality of the method of performing fingerprint matching onto a single chip or multiple chips programmed to carry out the method steps described herein, or may be embodied in a general purpose computer having the appropriate peripherals attached thereto and software stored on non-transitory computer readable media that can be loaded into main memory and executed by a processing unit to carry out the functionality of the apparatus and steps of the method described herein.

It is to be understood that the present invention is not limited to the embodiments described above, but encompasses any and all embodiments within the scope of the following claims.

We claim:

1. A computer-implemented method of performing fingerprint matching, comprising the steps of:
    acquiring a first fingerprint image;
    locating a reference core point within the first fingerprint image in order to initiate feature extraction of the first fingerprint image;
    establishing a region of interest (ROI) around the reference core point;
    decomposing the region of interest into eight separate directional sub-band outputs;
    calculating translation, rotation, and scaling (TRS) independent moment invariants and affine moment invariants from each of the eight separate directional sub-band outputs by:
        calculating at least one geometric moment invariant $M_{pq}$, said geometric moment invariant calculation being defined by the relation $M_{pq}=\int_{-\infty}^{\infty}\int_{-\infty}^{\infty} x^p y^q f(x,y)dxdy$ for p, q=0, 1, 2, ..., n, where n represents a number of stored template features, x and y are Cartesian coordinates, and f(x,y) is a continuous function;
        adapting the geometric moment invariant calculation to grayscale images having pixel intensities I(x,y), the geometric moment invariant calculation adaptation being characterized by the relation $M_{Ij}=\Sigma_x\Sigma_y x^I y^j I(x,y)$ for I,j=0, 1, 2, ..., n;
        calculating at least one complex moment invariant $c_{pq}$, the complex moment invariant calculation being defined by the relation $c_{pq}=\int_{-\infty}^{\infty}\int_{-\infty}^{\infty}(x+iy)^p(x-iy)^q f(x,y)dxdy$, where i is the complex number, the at least one complex moment invariant being based on a polynomial basis $k_{pq}$ characterized by the relation $k_{pq}(x,y)=(x+iy)^p(x-iy)^q$; and
        calculating at least one orthogonal moment $v_{pq}$, the orthogonal moment invariant calculation being defined by the relation $v_{pq}=n_p n_q \iint_\Omega p_p(x)p_q(y)f(x,y)dxdy$, wherein $n_p$ and $n_q$ are normalized factors and $\Omega$ is an area of orthogonality, the grayscale image being scaled such that its support is contained in $\Omega$;
    combining features calculated from each of the separate directional sub-band outputs into a first feature vector $V_f$ characterized by the relation $V_f=\{I_{\theta 1}, I_{\theta 2}, \ldots, I_{\theta k}\}$, where $\theta \in \{0,1,2,3,4,5,6,7\}$, corresponding to the eight separate directional sub-band outputs, k $\in \{0, 1, 2, \ldots, 56\}$, corresponding to the independent moment invariants from each of the eight separate directional sub-band outputs, and $I_{\theta k}$ is a feature sub-block of the $\theta$-th directional sub-band and the k-th independent moment invariant;
    calculating an absolute distance between the first feature vector and a second vector $V_{f2}$ including features of a second fingerprint having similarly obtained moment invariants, the second vector being characterized by the relation $V_{f2}=\{b_1, b_2, \ldots, b_n\}$, where each of the $\{b_1, b_2, \ldots, b_n\}$ represent one of the n stored template features; and
    displaying match results based on the first and second fingerprint absolute distance calculation step.

2. The computer-implemented method of performing fingerprint matching according to claim 1, wherein said steps of calculating TRS and calculating affine moment invariants further comprise normalization of each of the moment invariants.

3. The computer-implemented method of performing fingerprint matching according to claim 1, wherein said step of calculating TRS and calculating affine moment invariants further comprises the step of calculating at least one central moment invariant $\mu_{pq}$, the central moment invariant calculation being defined by the relation $\mu_{pq}=\int_{-\infty}^{\infty}\int_{-\infty}^{\infty}(x-x_c)^p(y-y_c)^q f(x,y)dxdy$, wherein a digital image representation of g(x,y) characterizes $\mu_{pq}$ by the relation $\mu_{pq}=\Sigma_x\Sigma_y(x-x_c)^p(y-y_c)^q f(x,y)$, where $$x_c = \frac{m_{10}}{m_{00}} \text{ and } y_c = \frac{m_{01}}{m_{00}},$$

where $m_{pq}$ represents a moment of order for p,q=0, 1, 2, ..., n.

4. The computer-implemented method of performing fingerprint matching according to claim 3, wherein said step of calculating TRS and calculating affine moment invariants further comprises the step of calculating at least one absolute affine invariant, the at least one absolute affine invariant calculation being defined by the relation $$\left(\frac{I(f)'}{\mu_{00}^{w+r}}\right) = \left(\frac{I(f)}{\mu_{00}^{w+r}}\right),$$

where I(f) is a function on (f), I(f)' represents I(f) following an affine transform thereon, w is a weight of the invariant, and r comprises at least two points in a field of the image.

5. The computer-implemented method of performing fingerprint matching according to claim 4, wherein said normalization step further comprises using an FBI WSQ standard for gray scale images characterized by the relation $$I'(i,j) = \frac{I(i,j) - M}{VAR'},$$

where VAR'=VAR/128 for 8 bits of precision per pixel, where VAR is an estimated variance of the first fingerprint image and M is an estimated mean of the first fingerprint image.

6. The computer-implemented method of performing fingerprint matching according to claim 5, wherein said step of locating of a reference core point further comprises the steps of:

estimating an orientation field O using a window size of w×w;

converting an orientation of the first fingerprint image into a continuous vector field $(\phi_x, \phi_y)$ characterized by the relations $\phi_x(I,j)=\Sigma_{u=-w_\phi/2}^{w_\phi/2}\Sigma_{v=-w_\phi/2}^{w_\phi/2}W(u,v)\cdot\phi_x(I-uw,j-vw)$ and $\phi_y(I,j)=\Sigma_{u=-w_\phi/2}^{w_\phi/2}\Sigma_{v=-w_\phi/2}^{w_\phi/2}W(u,v)\cdot\phi_y(I-uw,j-vw)$ thereby smoothing the orientation field in a local neighborhood, the smoothed orientation field being represented as O', where W is a two-dimensional low-pass filter with unit integral and $w_\phi \times w_\phi$ specifies a size of the filter;

computing $\epsilon$, an image containing only the sine component of O';

initializing A, a label image used to indicate the reference core point;

integrating pixel intensities for each pixel (i j) of the orientation field;

finding a maximum value point based on the pixel intensities integration; and assigning coordinates of the maximum value point as the reference core point.

7. The computer-implemented method of performing fingerprint matching according to claim 6, wherein said step of calculating an absolute distance comprises the steps of representing the first feature vector by a set of n features, $a_1, a_2, a_3, \ldots, a_n$ and computing a Euclidian distance $R_m$ characterized by the relation $$R_m = \sum_{i=1}^{n} \frac{|a_i - b_i|}{\max(a_i, b_i)}.$$

* * * * *